United States Patent [19]
Dickopp et al.

[11] 3,973,080
[45] Aug. 3, 1976

[54] PLAYBACK DEVICE FOR A DISC-SHAPED RECORD CARRIER WITH TRANSDUCER LIFTING FOR CHANGING PLAYBACK GROOVE FOR FAST, SLOW OR STOP EFFECTS

[75] Inventors: Gerhard Dickopp; Benno Jahnel; Wolfgang Rainer; Paul Ludwig Dümmen, all of Berlin, Germany

[73] Assignee: TED Bildplatten Aktiengesellschaft, AEG-Telefunken, TELDEC, Zug, Switzerland

[22] Filed: Apr. 11, 1974

[21] Appl. No.: 460,164

[30] Foreign Application Priority Data
Apr. 11, 1973 Germany............................ 2318871

[52] U.S. Cl. .................. 178/6.6 R; 178/6.6 DD; 178/6.6 FS; 179/100.4 D
[51] Int. Cl.² .................. H04N 5/76; G11B 3/36; G11B 17/06
[58] Field of Search....... 178/6.6 R, 6.6 FS, 6.6 DD, 178/6.6 P, 6.7 A; 179/100.4 R, 100.4 M, 100.41 L, 100.3 V, 100.4 D; 360/75, 77, 78, 104, 106, 86, 97, 98, 99, 102, 103

[56] References Cited
UNITED STATES PATENTS

| | | | |
|---|---|---|---|
| 3,530,258 | 9/1970 | Gregg et al. ................. | 179/100.3 V |
| 3,767,848 | 10/1973 | Schuller et al. .................. | 178/6.6 R |
| 3,787,616 | 1/1974 | Falk et al. .............................. | 360/75 |
| 3,852,816 | 12/1974 | Stewart ................................. | 360/86 |
| 3,854,015 | 12/1974 | Janssen ......................... | 179/100.3 V |

OTHER PUBLICATIONS

Janssen et al., Control Mechanisms of the Philips 'VLP' Record Player, Philips Tech. Rev., vol. 33, No. 7, 10/73, pp. 192–193.

*Primary Examiner*—Raymond F. Cardillo, Jr.
*Attorney, Agent, or Firm*—Spencer & Kaye

[57] ABSTRACT

A playback device for disc-shaped record carriers containing video signals stored in the grooves thereof which includes an arrangement which, in response to an applied power pulse, displaces the pickup, during playback, by a number of groove widths transversely to the direction of the groove.

13 Claims, 6 Drawing Figures

PLAYBACK DEVICE FOR A DISC-SHAPED RECORD CARRIER WITH TRANSDUCER LIFTING FOR CHANGING PLAYBACK GROOVE FOR FAST, SLOW OR STOP EFFECTS

BACKGROUND OF THE INVENTION

The present invention relates to a playback device for disc-shaped record carriers with signals stored in the grooves of the record and, more particularly, to an arrangement for moving the disc playback head during playback in a direction transverse to the direction of the grooves.

In connection with the method for recording signals according to the high density storage technique which has become known as the "picture record technique" and playback by pressure scanning, U.S. Pat. No. 3,767,848, issued Oct. 23, 1973 to E. Schüller et al, describes a playback device which includes a pickup for the picture signals which moves radially across the record during playback and is guided by a positive guide means which is coordinated with the rotation of the record. The playback device includes an elastic mount for the pickup and the advancing of the pickup can be switched off, or the advancing device is connected with the turntable drive shaft of the turntable via an infinitely or stepwise variable drive assembly, so that it is possible to effect slow motion or elapsed time display of the recorded signal. The pickup mount is so designed that when the radial advance is switched off the pickup is carried along over a few grooves of the record due to the groove guidance before it jumps back as a result of the elasticity of the mount.

The drawback of such an arrangement is the fact that the jumping of the pickup is dependent on a series of contingencies over which the operator has no influence and which prevent jumping of the pickup at precisely predetermined points over defined distances. These contingencies, are, inter alia, the manufacturing variations in the pickup and its mount as well as the unavoidable tolerances which occur during manufacture of the record carrier. Although experiments have been made to favor jumping of the pickup at predetermined points in the groove by deforming the groove, the results were unsatisfactory since this still did not permit a precise predetermination of the changeover of the pickup into an adjacent groove.

SUMMARY OF THE INVENTION

It is an object of the present invention to provide an improved device which permits influencing of the jumping or transverse movement of the pickup during playback of information stored in the grooves of a record carrier so that it will be possible, for example, during playback of television signals, to produce a still picture, a slow motion playback, an elapsed time playback or even a playback reversed in time.

This is accomplished according to the invention in that in a playback device for a disc-shaped record carrier containing video signals stored in the grooves thereof which includes means for rotating the record carrier, a pickup having a stylus arranged to contact the surface of the record carrier and engage in a groove thereof, and a mount for elastically supporting the pickup, means are provided for displacing the pickup, during playback, by a selected number of groove widths transversely to the direction of the groove in response to a selectively applied power pulse.

The present invention makes it possible to influence the frequency of the jumps and the size of the jump performed by the pickup within wide limits independent of one another by selection of the points in time and the intensity of the individual applied pulses. The particular advantages of the present invention will become particularly evident in connection with the embodiments described below.

Particularly during playback of television signals it is necessary for the instances at which the pickup jumps from one groove to the adjacent grove or grooves to be correlated with the picture content. Preferably, the pickup will be caused to jump during the blanking times contained in the standard television signal since a temporary absence of the signal at that time will not annoy the viewer. Such a correlation can either be effected by controlling the power pulses by the setting of the drive means for the record carrier or, if the position of the record carrier on the drive means is undefined, by signals present on the record carrier itself.

Advisably the pickup is influenced by the displacement forces as closely as possible to the portion which engages in the groove, i.e., the tracking or guide element which is usually provided in the form of a diamond. However, the displacement forces can also be transmitted by means of a shock wave which travels from a remote location via the pickup mount to the guide element. Advisably, electrical or magnetic means, such as electromagnets or piezoceramic elements, are used to generate the displacement forces.

In order to prevent unnecessary wear on the record carrier, it is also advantageous for the applied displacement force not only to contain a component transverse to the direction of the groove, but also a further component which is directed opposite the contact pressure of the tracking element on the surface of the record carrier since this facilitates the departure from the groove by the tracking element and prevents the tracking element from cutting into the sides of the groove.

If devices are provided which can provide forces in two different directions which are each perpendicular to the direction of the groove, the jumping direction of the pickup can be influenced within wide limits. In order to properly control the movements of the pickup it is favorable for both directions of applied force to form an angle of 135° with the direction of the contact pressure of the pickup on the surface of the record carrier. There also exists the possibility, with the appropriate shaping of the force producing pulses, i.e. with a steep leading edge and a flat trailing edge of the power pulse with respect to its time sequence, to quickly lift the pickup and to slowly set it down again so that springback of the pickup is prevented and the record carrier is further protected.

Since, in contradistinction to the known device, the pickup is no longer displaced by the elasticity of its suspension, but rather by an active influence exerted on the pickup, and since the pickup is lifted away from the record carrier surface during the displacement, its compliance can be selected to be very high so that there is little wear on the record carrier and the forces required for the displacement by the device according to the invention are small.

In a record carrier with a spiral groove where one television picture frame is stored on each groove circumference, i.e., in each turn of the groove, the advancing speed $v_s$ of the pickup, which is a measure for the playback speed, is calculated from the number of pulses $i$ per second and the size s of the jump accordng to the formula $$v_x = v_0 \left[ \frac{i \cdot s}{f \cdot b_r} + 1 \right]$$

where the size of the jump s depends on the intensity of the force impulse applied to the pickup and takes on positive or negative values depending on the direction of the forces with respect to the groove pitch, $v_0$ is the normal advancing speed, $b_r$ is the width of the groove, and f is the picture playback frequency.

DETAILED DESCRIPTION OF THE PREFERRED EMBODIMENTS

Figure 1:
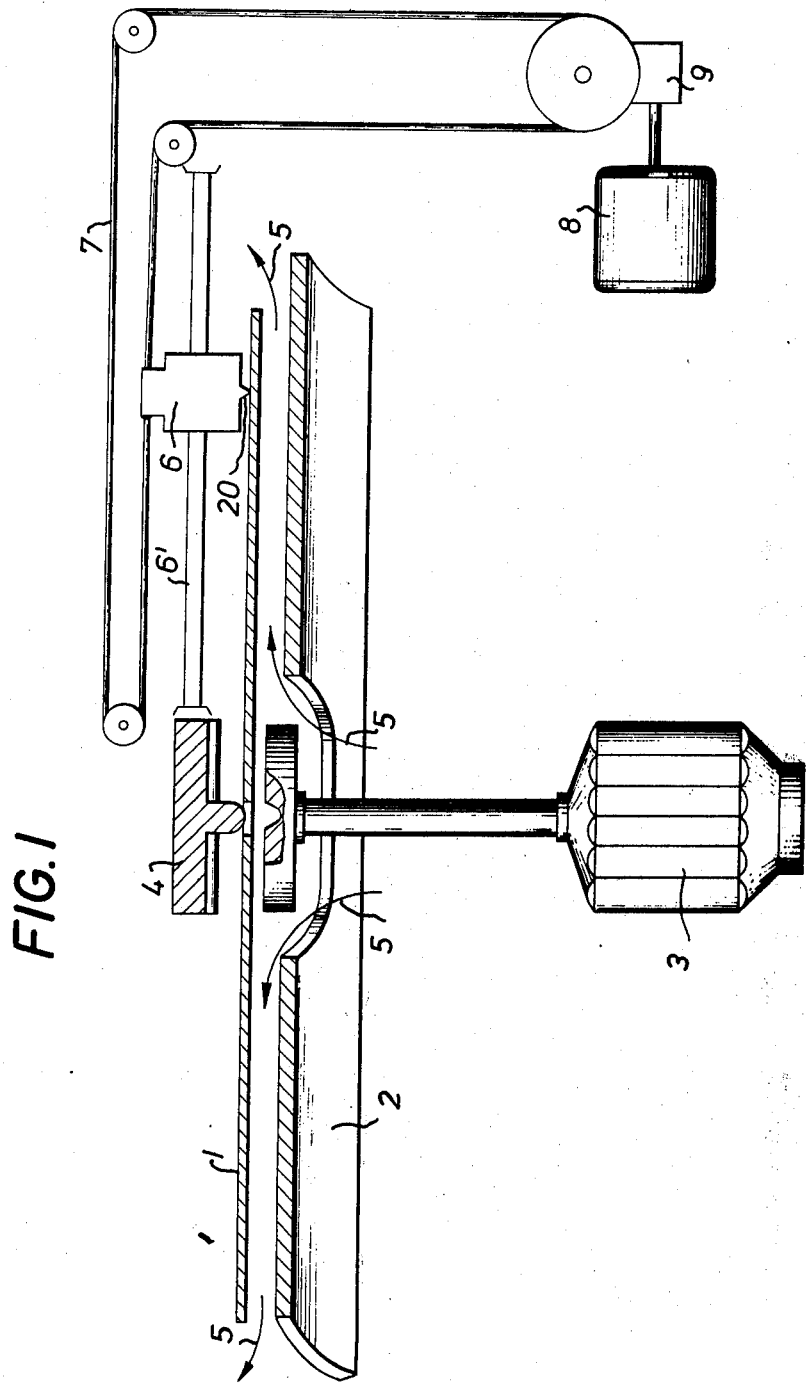
FIG. 1 is a partly schematic, partly pictorial view of a playback device for disc-shaped record carriers with television signals stored in grooves according to the state of the art.

In the schematic representation of FIG. 1 a record carrier 1, having grooves on the upper surface thereof, is caused to rotate above a stationary support surface 2 by means of a follower 4 driven by a drive motor 3. The record carrier 1 here rotates above a cushion of air produced by a stream of air 5. A pickup 20 for the playback device is fastened on a carriage 6, which carries the pickup mount and is mounted on a stationary slide rail 6'. During playback of the signals recorded on record carrier 1, the carriage 6 is moved in a radial direction by means of a rope pulley 7, a second drive motor 8 and gears 9, causing the pickup 20 to be moved along the grooves on record carrier 1.

Figure 2:
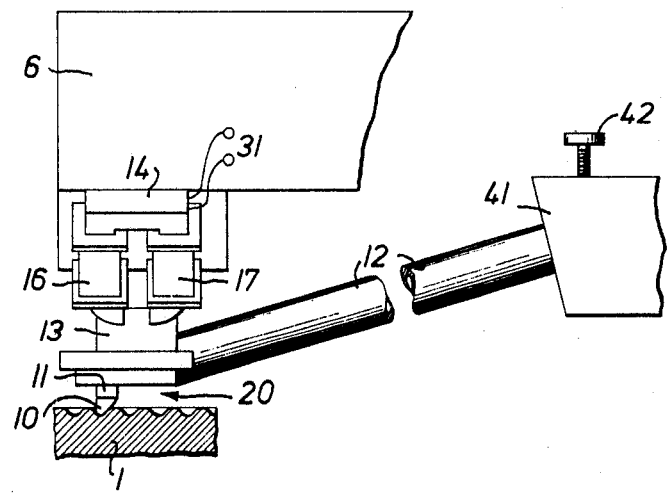
FIG. 2 is an elevational view of one embodiment of a pickup for the playback device of FIG. 1 and illustrating one embodiment of an arrangement according to the invention for displacing the pickup transversely to the direction of the groove.

A pickup 20, shown with its mount in FIG. 2 in an elevational view, consists, in a known manner, of a stylus 10 and an electromechanical transducer 11. The stylus 10 contacts the record carrier 1 and is engaged in a groove which in the preferred embodiment has television signals stored therein, i.e. the record carrier constitutes a so-called picture record. The pickup stylus 10 together with the electromechanical transducer 11 are mounted on a supporting tube or holder 12 which is elastically or yieldably mounted in carriage 6, e.g., in the manner shown in the above mentioned U.S. patent to Schüller et al. The elastic mounting renders the pickup 20 capable of following the movement of the grooves produced by the pitching and yawing of the record carrier 1.

In order to be able to directly locate individual parts of the recording in individual grooves or to repeat individual parts of the recording on a spiral groove, the pickup is provided according to the invention with an arrangement which makes it possible during playback to displace the pickup 20, and hence the stylus 10 which is in contact with the surface of record carrier 1, transversely to the groove direction by the application of force impulses. By proper selection of the component of the force impulse which is transverse to the groove direction, it is thus possible to effect a transverse jump of the pickup which is accurate with respect to the grooves.

If the pickup is biased by its lateral deflection, jumping of the pickup can be achieved by merely lifting it by means of a force component acting in a direction opposite to that of the contact pressure force P.

Figure 3:
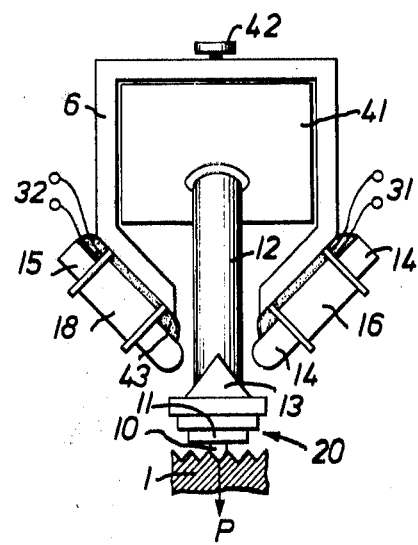
FIG. 3 is a front view of the pickup and arrangement of FIG. 2.

As shown in FIGS. 2 and 3, the arrangement for transversely displacing the pickup includes a small soft iron plate 13 which is mounted on the pickup 10 and as illustrated is preferably triangular in shape, and two electromagnets which are positioned adjacent to and can exert a force on the plate 13. The two electromagnets are formed by two iron cores 14 and 15 respectively, which are connected to the mount 47 in a desired manner and are positioned in a V-shape so that each core forms an angle of 135° with the direction of the contact force P, and by pairs of coils 16, 17 and 18, 19 (not shown) which are mounted on the iron cores 14 and 15, respectively. The iron core 15 with the pair of coils 18 and 19 is disposed behind the iron core 14 in the illustration in FIG. 2.

FIG. 3 shows the V-shaped arrangement of the iron cores 14 and 15. Although in principle the force impulses can be applied to the pickup in any desired manner, the illustrated arrangement for the magnetic control of the jumping of the pickup has been found to be particularly suitable. The V-shaped arrangement makes it possible for the pickup to be displaced in two different directions, i.e., to preceding and subsequent grooves. Moreover, actuation of the device simultaneously applies a force component which acts in a direction opposite to that of the contact pressure acting on the stylus 10. This makes it possible, to not only lift the pickup for displacement transversely to the groove direction so that the groove sides are substantially protected, but also to simultaneously set the force component lying in the plane of the drawing in FIG. 3, i.e. the transverse component, so that it acts in any desired direction. This also includes, for example, lifting of the stylus 10 from record carrier 1 upon completion of the playback. For this purpose, the two pairs of coils 16, 17 and 18, 19 are simultaneously actuated via power pulses applied to the leads 31 and 32 respectively by a control circuit connected thereto.

The mount 41 is fixed to the carriage 6 by a screw 42. The coils 16, 17 and 18, 19 (not shown) and the iron cores 14 and 15 are fixed to the carriage 41 by an adhesive 43.

In order to assure the best possible protection for the material of the record carrier during replacing of the pickup 20 onto the surface of the record carrier 1, the force impulses acting on the pickup 20 are preferably shaped so that the pickup lifts off from the surface of the record carrier 1 as quickly as possible but is subsequently lowered down again as slowly as possible and without bounce.

Figure 4:
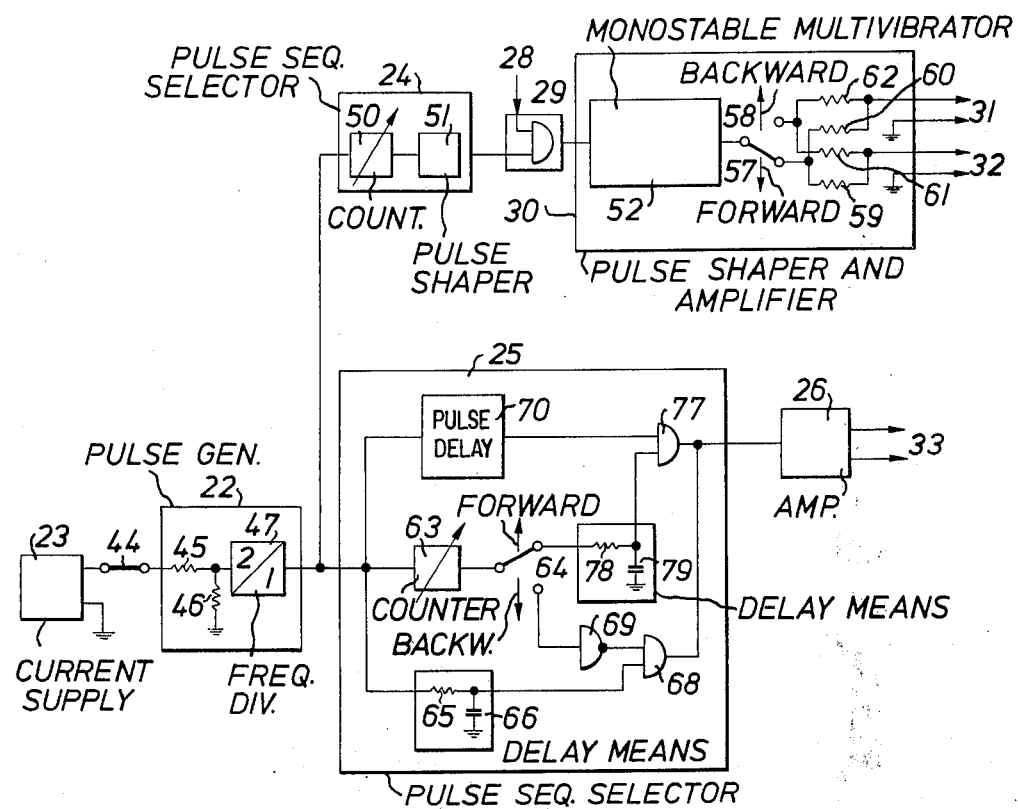
FIG. 4 is a block circuit diagram of a control circuit for applying power pulses to the arrangement of FIGS. 2 and 3 to move the pickup in the playback device.

FIG. 4 is a block circuit diagram for the control means for displacing the pickup 20 transversely to the direction of the groove. The control circuit includes a pulse generator 22 which emits square wave pulses at a frequency whose multiples are synchronized in a known manner with a frequency which is related to the record carrier rotation frequency, for example, by means of a current supply network 23. The output pulses from pulse generator 22 are fed to two variable pulse sequence selectors 24 and 25. By means of these pulse sequence selectors 24 and 25 the pulse sequences required to displace the pickup 20, which pulse sequences also are related to the speed of rotation of the record carrier, can be selected.

The pulse sequence at the output of the pulse sequence selector 25 is fed to an amplifier 26 to whose output terminals 33 is connected the drive motor 8 for the pickup carriage 6 of FIG. 1. The drive motor 8 is a synchronous motor with a great number of poles and is used as a stepping motor which moves carriage 6 and the support 12 for pickup 20 transversely to the direction of the groove at a speed which is set by the pulse sequence selector 25.

The pulse sequence selector 24 determines the frequency of the power pulses applied to the electromagnets which in turn apply forces on the pickup 20 to effect a displacement of the pickup transversely to the direction of the groove. The output pulses from the selector 254 are fed to an AND gate 29 which effectively shifts the times of the pulses with reference to the scanned groove circumference in a manner so that a lateral displacement of the pickup during playing back of television pictures is effected only during the vertical blanking periods of the standard television signal in order that the lack of a signal caused by the jumping of the pickup will not be noticed by the viewer. For this purpose a reference signal which is a part of the television signal being scanned is fed to an input 28 of the AND gate 29. These portions of the recorded signal which are correlated with a television frame or field, such as the vertical sync pulses, are particularly suited for this purpose.

The tine shifted output pulses from the AND gate 29 are fed to a pulse shaper (monostable multivibrator) and amplifier 30 wherein a variation of the intensity and the shape of the power pulse to be applied to the electromagnets can be effected. As indicated above, in the pulse shaper 30 the pulses from the AND gate are preferably shaped so that the power pulses applied to the electromagnets have a steep leading edge and a flat trailing edge with respect to their time sequence. This is accomplished in the preferred embodiment by simply providing the output pulses from the pulse shaper and amplifier 30 in the form of square wave pulses. As is well known, since the electromagnets connected to the output terminals 31 and 32, i.e., the loads for the circuit 30, are inductances, the current through the inductances will rapidly rise with the steep rising edge of the output pulse from circuit 30 but will only decay slowly when the output pulse from circuit 30 terminates, thus providing the desired shape for the power pulses. Moreover, in the pulse shaper and amplifier the ratio of the voltages or power pulses applied to the two pairs of coils 16, 17 and 18, 19 via terminals 31 and 32 respectively, and thus the direction of movement of the pickup, can be varied.

The circuit diagram of FIG. 4 will be described in detail for the scanning of a carrier with a spiral groove having two television fields (i.e. one frame) stored in each of its windings or turns. Thus the rotation of the carrier occurs at 30 Hz (1800 rpm) during playback.

The pulse generator 22, which can be switched off by the switch 44, which contains two resistors 45 and 46 and a conventional frequency divider 47 for reducing the supply frequency, of e.g. 60 Hz, to 30 Hz.

In the selector 24 there is a presettable counter 50 which produces an output pulse after each or every second or every third (and so on) of its entrance or input pulses according to the setting of the counter. The counter pulses are fed to a monostable multivibrator 51 which operates as a pulse shaper and makes the pulses nearly as long as the pulse period, i.e. as long as the duration of one field minus the duration of its vertical sync pulses.

In the AND gate circuit 29, the output pulses are produced which have their front or leading edges coincident with the front or leading edges of the vertical sync pulses applied to input 28. These vertical sync pulses are rectangular pulses with a frequency of 60 Hz (30 Hz are also possible).

The pulse shaper and amplifier 30 contains a monostable multivibrator 52 for producing pulses shorter than a vertical blanking period of the scanned television signal. The monostable multivibrator 52 is followed by a two position switch 58. In the position shown the output pulses of the monostable multivibrator 52 are fed to resistors 59, 60, leading to the terminals 31, 32. In this position the pickup will be displaced forward, i.e. to the left in FIGS. 1 and 3. For this purpose the resistance of resistor 59 must be smaller than that of resistor 60. In the other position of the switch 58, the pickup will be displaced backward. Therefore the resistance of resistor 62 must be smaller than that of resistor 61.

In the pulse sequence selector 25 there is a second counter 63 of the same nature as the counter 50. Connected to the output of counter 63 is a switch 64 which has the same functions as the switch 58. In each switch-position of switch 64, the output pulses of the generator 22 are fed to a delay means, consisting of the resistor 65 and the capacitor 66, to provide compensation for the delay of the counter 63 and the inverter amplifier 69 connected to one position of switch 64. If the counters 63 and 50 are counting without yet having produced any output pulses, or if the switch 64 is in its forward position, a permanent output signal is fed to one input of the AND gate 68 by the inverter amplifier 69. At the same time the other input of AND gate 68 receives pulses with half the frequency of the vertical sync pulses (30 Hz). Thus the amplifier 26 is fed with the output pulses of the AND gate 68 with the same frequency. The drive motor 8 than will move the carriage 6 (FIG. 1) with its normal speed which is necessary when the pickup follows the spiral groove, i.e. without displacing. If now the switches 58, 64 are in their backward positions and the first output pulse comes from the counters 50 and 63 the pickup will be displaced backward by one groove width and at the same time there will no longer be an output signal from the inverter amplifier 69. Therefore the AND gate 68 does not feed a pulse to the amplifier 26 and to the drive motor, which thus does not move the pickup during the time it is displaced backward by one groove width.

For the case when switch 64 is in its forward position as shown the output pulses of the pulse generator 22 are delayed by the pulse delay circuit 70. The delay time of circuit 70 is a half period of the pulse generator 22. These delayed pulses are fed to one input of an AND gate 77 which produces output pulses when its other input also is supplied with a high level signal. This occurs when output pulses are supplied by the counter 63 to the AND gate 77, which pulses are delayed by the resistor 78 and the capacitor 79 in such a manner that the pulses coincident with one backward or trailing edge of the positive output pulses of the frequency divider 47. The output pulses of the AND gates 77 and 68 are added and fed to the amplifier 26. Thus the drive motor not only receives the pulses from the gate 68 with half the supply frequency but additionally receives pulses with the frequency of the output pulses of the counter 63, which additional pulses lie between (preferably in the middle of) two adjacent output pulses of the AND gate 68. Thus the drive motor rotates faster for a short time when the pickup is displaced forward from one winding or turn of the groove to the next one.

Although the present invention is just as suitable for access to any desired signals which are stored in the grooves of a disc-shaped record carrier in the form of contiguous blocks of information, as indicated above it is particularly applicable to the playing back of television signals. A standard television signal without interference can be obtained in spite of a change of grooves if the television signals are recorded so that the same type of information, for example the field or line changing pulses, are recorded adjacent to one another in adjacent grooves. This is the case during the playback of standard television signals if each complete revolution or turn of a spiral shaped groove contains either a constant whole number of frames or one field.

The change of frames takes place without interference if the times of the jumping of the pickup are set so that they fall into such time periods where signal portions which are not visible to the viewer, such as blanking pulses, for example, are being transmitted. With suitable association of the pickup advancing speed and the jump pulses for the pickup it is possible to achieve special effects known from the reproduction of moving pictures, such as slow motion, elapsed time reproduction, still pictures and reverse reproduction.

For the reproduction of still pictures, for example, the transverse advance of the carriage 6 is stopped, while the pickup receives a jumping pulse to jump one width of a groove transversely to the direction of the groove and opposite to the direction of the groove pitch during each revolution of the record carrier.

For elapsed time reproduction the advancing speed of the carriage 6 is increased by increasing the frequency of the pulses at the output of selector 25 while the pickup simultaneously receives a jumping pulse in the direction of the groove pitch. By increasing the intensity of the power pulse it is possible to have the pickup jump several groove widths at a time in each jump so that the elapsed time effect can be increased by a large factor.

A slow motion reproduction is produced by reducing the speed of advance of the carriage 6 and causing the pickup to jump back in the meantime to repeat individual pictures or frames.

In order to protect individual groove turns of the record carrier against excessive wear, it is advisable, after a period of time, to suppress the return jump pulse required with each revolution of the record carrier in order to permit the pickup to enter an adjacent groove turn, where, in the average recording, the information content only slightly differs from that of the adjacent groove turn.

During reverse reproduction the pickup and the power pulses must be so dimensioned that the pickup jumps over at least two grooves in every jump in a direction opposite to the direction of the groove pitch.

Figure 5:
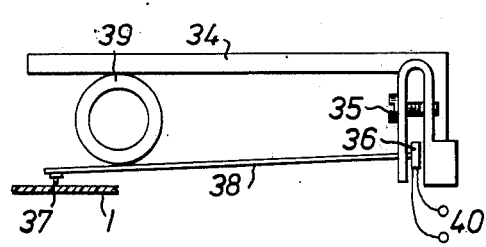
FIG. 5 is a side view of a further embodiment of a pickup and arrangement for moving same with a piezoceramic element.
Figure 6:
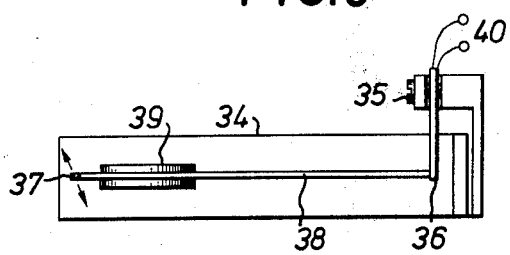
FIG. 6 is a plan view of the pickup arrangement of FIG. 5.

FIGS. 5 and 6 show a further embodiment of the present invention which can be easily realized if a force component is to be applied to the pickup only in one direction. According to this embodiment of the invention, a supporting arm 34 is provided which is permanently connected to the carriage 6 of the playback device shown in FIG. 1 and which extends laterally therefrom in the direction of the pickup 37 which is mounted on one end of an arm or rod 38. The other end of the arm 38 is connected to one end of a piezoceramic element 36 whose other end is connected to the support arm 34, which in the present case serves as a part of the pickup mount, via a U-shaped clamping arrangement and a clamping screw 35. A damping ring 39 connected between the arms 34 and 38 forms an additional support for the arm 38 and pickup 37. The pulses for displacing the pickup 37 are generated by the piezoceramic element 36 which is deformed as a result of an electrical voltage applied to terminals 40 (for example, from terminals 31 or 32 of FIG. 4) and, depending on the polarity of the voltage, effects a displacement of the pickup in one of the directions of the arrows shown in FIG. 6. With this embodiment, if the above mentioned pulse shape of a steep leading edge and a flat trailing edge is desired, then a further pulse shaping circuit, well known in the art, must be incorporated into the circuit 30 to produce this effect.

The present invention can be used with particular advantage for teaching instruments since the didactic effect of the reproduction of still pictures often exceeds that of moving scenes. By utilizing each individual groove turn for one still picture, a very large number of so-called learning units can be accommodated on the surface of a record carrier The present invention further makes it possible to eliminate spiral grooves for the storage of data or for the storage of individual pictures. In particular, it may be more advantageous to store the information in concentric grooves which are directly selected by displacing the pickup transversely to the direction of the groove. Moreover, the device according to the present invention for displacing the pickup can be incorporated without difficulty into existing instruments and it is possible to subsequently equip existing instruments with the device since in such a case, other than supplementing the electrical control circuits, it is only necessary to exchange the pickup mount.

It will be understood that the above description of the present invention is susceptible to various modifications, changes and adaptations, and the same are intended to be comprehended within the meaning and range of equivalents of the appended claims.

What is claimed is:

1. In a playback device for a disc-shaped record carrier containing signals stored in the grooves thereof, said device including means for rotating the record carrier, a movable carriage, means for moving said carriage in a direction radially to the record during playback, a pickup having a stylus arranged to contact one surface of the record carrier and engage in a groove thereof, and a mount which is connected to said carriage, for elastically supporting said pickup, the improvement comprising:

means for providing power pulses at desired times during playback; and energy pulse generating means responsive to said power pulses for applying an energy pulse to said pickup for lifting said pickup, displacing said pickup by a desired number of groove widths transversely to the direction of the groove and then returning said pickup to said surface of said carrier.

2. A playback device as defined in claim 1 wherein said power pulse providing means includes a pulse shaping means for causing the power pulses applied to said energy pulse generating means to have a steep leading edge and a flat trailing edge.

3. A playback device as defined in claim 1 wherein said power pulse providing means includes means for varying the sequence of the pulses imparted to said pickup.

4. A playback device as defined in claim 1 including means connected to said power pulse providing means and said means for rotating the disc for synchronizing the times at which said power pulses are provided with the rotation of the disc.

5. A playback device as defined in claim 1 wherein said power pulse providing means is responsive to signals which are contained in the recorded signal and which are correlated with the groove circumference.

6. A playback device as defined in claim 1 wherein said power pulse providing means includes means for varying the intensity of the power pulses.

7. A playback device as defined in claim 1 wherein said energy pulse generating means includes: a small soft iron plate mounted on said pickup; and an electromagnet which is attached to said mount and responsive to the output of said power pulse providing means, said electromagnet being positioned adjacent said soft iron plate so that upon receipt of a power pulse from said power pulse providing means a force transverse to the direction of the groove is applied to said pickup.

8. A playback device as defined in claim 1 wherein said mount includes an arm member from which said pickup is elastically suspended and wherein said energy pulse generating means comprises a piezoceramic element connected between said pickup and said arm member.

9. A playback device as defined in claim 1 wherein said energy pulse generating means includes first and second means, responsive to the output of said power pulse providing means, for applying respective forces to said pickup in different directions which are each perpendicular to the direction of the groove.

10. A playback device as defined in claim 9 wherein said first and second means each form an angle of 135° with the direction of the contact pressure exerted by said pickup on the record carrier.

11. A playback device as defined in claim 10 wherein said energy pulse generating means further includes a small soft iron plate mounted on said pickup, and wherein each of said first and second means includes an electromagnet which is attached to said mount and positioned adjacent said plate.

12. A playback device as defined in claim 1 wherein said stored signals are television signals and wherein each complete revolution of a groove contains a field or a constant whole number multiple of fields of a television picture.

13. A playback device as defined in claim 12 wherein the record carrier contains a spiral-shaped recording track.

* * * * *